United States Patent [19]

Numata

[11] Patent Number: 5,298,984
[45] Date of Patent: Mar. 29, 1994

[54] DEVICE FOR POSITIONING THE CATHODE RAY TUBES IN A PROJECTION TELEVISION SYSTEM

[75] Inventor: Kiyoshi Numata, Kanagawa, Japan

[73] Assignee: Sony Corporation, Tokyo, Japan

[21] Appl. No.: 991,340

[22] Filed: Dec. 16, 1992

[30] Foreign Application Priority Data

Dec. 18, 1991 [JP] Japan .................. 3-353786

[51] Int. Cl.$^5$ .............. H04N 5/645; H04N 5/655; H04N 5/74
[52] U.S. Cl. .................. 348/778; 348/826; 348/827
[58] Field of Search ............ 358/60, 64, 237, 249, 358/248, 250, 254, 242, 231; 313/36, 478; H04N 5/645, 5/655, 5/74, 9/16, 9/28, 9/31

[56] References Cited

U.S. PATENT DOCUMENTS

| | | | |
|---|---|---|---|
| 2,948,891 | 6/1957 | Smith | 358/249 X |
| 3,969,648 | 7/1976 | Hergenrother et al. | 358/60 X |
| 4,388,642 | 6/1983 | Reno, Jr. et al. | 358/60 |
| 4,400,723 | 8/1983 | Fanizza et al. | 358/60 |
| 4,404,588 | 9/1983 | Fanizza et al. | 358/60 |
| 4,621,293 | 11/1986 | Matis | 358/231 |
| 5,045,930 | 9/1991 | Hasegawa | 358/60 |

FOREIGN PATENT DOCUMENTS

| | | | |
|---|---|---|---|
| 58-106979 | 6/1983 | Japan | 358/60 |
| 61-295785 | 12/1986 | Japan | H04N 9/31 |
| 4-138785 | 5/1992 | Japan | H04N 5/74 |

*Primary Examiner*—James J. Groody
*Assistant Examiner*—Safet Metjahic
*Attorney, Agent, or Firm*—Lewis H. Eslinger; Jay H. Maioli

[57] ABSTRACT

A cathode ray tube device employed in a projection apparatus for projecting an image on a screen. The cathode ray tube device includes a supporting frame mounted on a rim of a front panel section of the cathode ray tube, a lens plate in the form of a frame having a center aperture, and having a projection lens system attached to it, and a positioning supporting member detachably mounted on a mounting base plate of the projection apparatus and adapted for positioning the supporting frame and the lens plate with respect to the mounting base plate for detachably supporting the supporting frame and the lens plate by the mounting base plate. The positioning supporting member has a lens plate supporting surface for supporting the lens plate at a tilt angle corresponding to a convergence angle with respect to the mounting base plate and a supporting frame supporting surface for positioning and supporting the supporting frame at a tilt angle corresponding to an elevation with respect to the lens plate and at a distance corresponding to a back focal length at back of the lens plate for accurately setting the convergence angle, elevation and the back focal length.

7 Claims, 6 Drawing Sheets

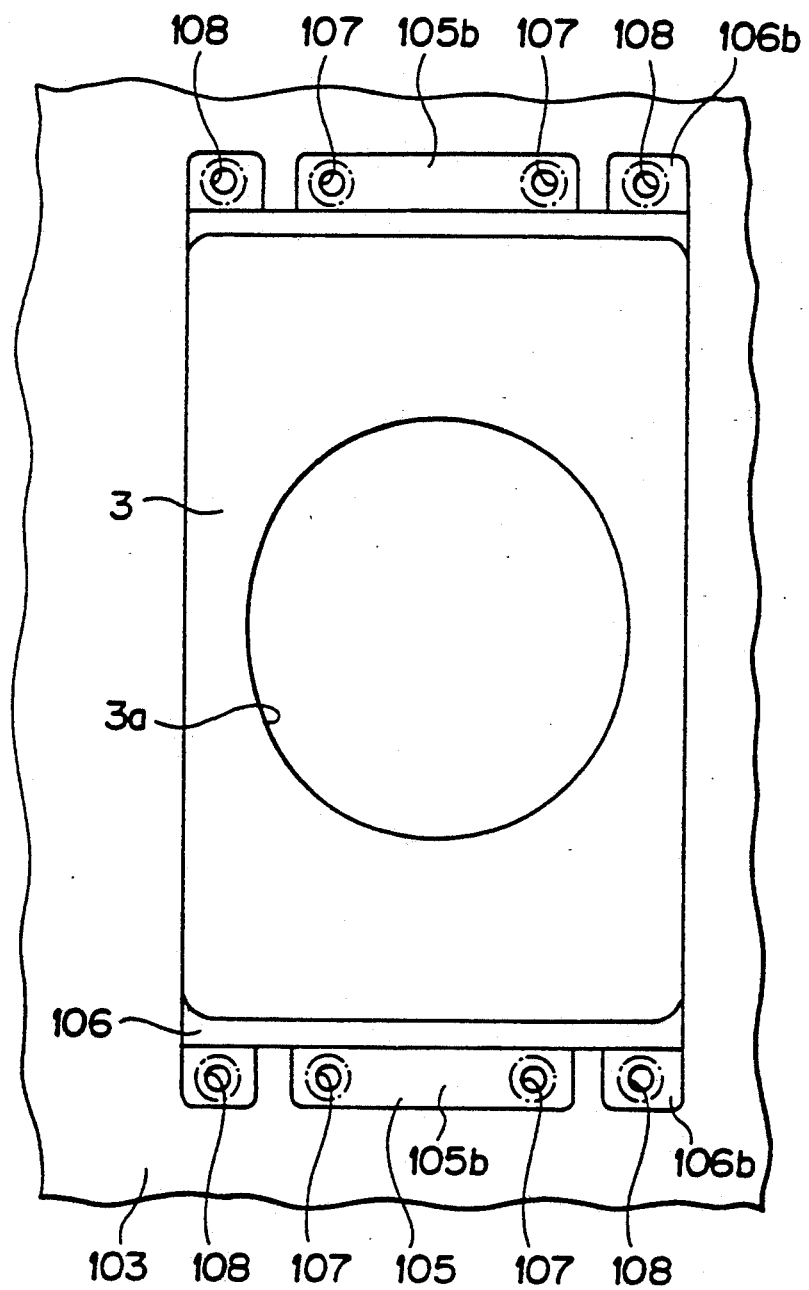

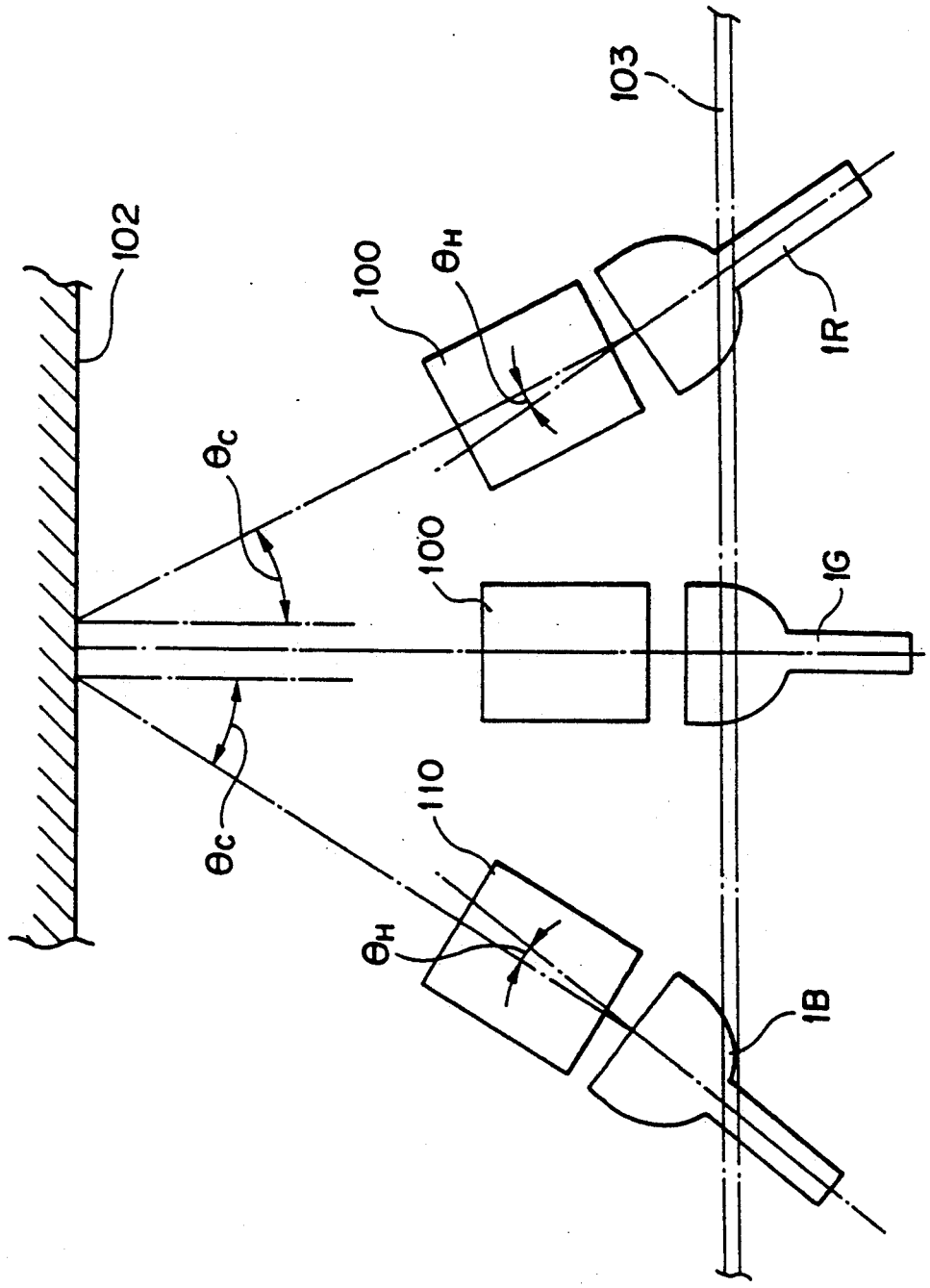

DEVICE FOR POSITIONING THE CATHODE RAY TUBES IN A PROJECTION TELEVISION SYSTEM

BACKGROUND OF THE INVENTION

1. Field of the Invention

This invention relates to a cathode ray tube device for a projection apparatus for projecting an image on a screen. More particularly, it relates to a cathode ray tube device for a projection apparatus in which a supporting frame for supporting a front panel section of a cathode ray tube and a lens plate mounting a projection lens system are supported by a positioning supporting member detachably mounted on a mounting base plate of the projection apparatus.

2. Description of the Prior Art

There has hitherto been proposed a projection apparatus for putting an image by a cathode ray tube and projecting the image via a projection lens system on a screen. With such projection apparatus, since the image put on the front panel section of the cathode ray tube is projected after being enlarged by the projection lens system, an image of a size larger than that put on the front panel section of the cathode ray tube may be easily projected on the screen.

Meanwhile, the number of pixels put on the cathode ray tube is fixed by a conversion system etc. of image signals supplied to the cathode ray tube. If a color image is to be displayed by the cathode ray tube, it is necessary to display blue-colored component images, green-colored component images and red-colored component images of the color image, each by one-third of the total number of pixels, so that the number of the pixels for displaying the color component images is necessarily decreased.

For this reason, if a color image is to be displayed on the above-described projection apparatus, a first cathode ray tube 101B for displaying a blue-color component image of the color image, a second cathode ray tube 101G for displaying a green-color component image of the color image and a third cathode ray tube 101R for displaying a red-color component image of the color image, as shown in FIG. 1, are employed for increasing the number of pixels for displaying the color component images of the color image for producing a satisfactory image. These cathode ray tubes 101B, 101G and 101R are arrayed horizontally in a side-by-side relation. These cathode ray tubes 101B, 101G and 101R are attached to and supported by a mounting base plate 103 of the projection apparatus by supporting members 105B, 105G and 105R, respectively.

The images of the color components displayed on these cathode ray tubes 101B, 101G, 101R are projected on a screen 102 by means of projection lenses 100, 100, 100 supported on the supporting members 105B, 105G, 105R for facing the front panel section of each of the cathode ray tubes. The color component images of the color image projected on the screen 102 are superimposed one on others to form the color image.

With the projection apparatus for projecting the color image using the first to third cathode ray tubes 101B, 101G, 101R, the projection lenses 100, 100, 100 associated with the cathode ray tubes 101B, 101G, 101R are arranged so that the optical axes of the projection lenses 100, 100, 100 intersect at the center of the screen 102. That is, the optical axes of the projection lenses 100, 100 associated with the first and third cathode ray tubes 101B and 101R make a convergence angle of $\theta_c$ with respect to a normal to the screen 102, as shown in FIG. 1.

With the present projection apparatus, the distance between the rear ends of the projection lenses 100, 100, 100 and the front panel sections of the cathode ray tubes 101B, 101G, 101R associated with these projection lenses, that is the back focal length as shown by an arrow B in FIG. 1, are set i n dependence upon the distance between the screen 102 and the projection lenses 100.

With the present projection apparatus, the optical axes of the projection lenses 100 and the normal lines to the front panel sections of the cathode ray tubes 101B, 101G, 101R associated with these projection lenses make an elevation, shown by arrow $\theta_H$ shown in FIG. 1, conforming to the above-mentioned convergence angle.

The convergence angle, elevation and the back focal length are set by the cathode ray tubes 101B, 101G, 101R and the projection lenses 100, 100, 100 being positioned with respect to the mounting base plate 103 by the supporting members 105B, 105G and 105R.

There has also hitherto been proposed a cathode ray tube device for a projector apparatus in which a supporting frame 120 is attached to the front panel section of the cathode ray tube 101 and the angle between the supporting frame 120 and the lens plate 130 carrying the supporting frame 120 and the projection lens is variably adjusted for enabling variable adjustment of the elevation, as shown in FIG. 2. With this conventional cathode ray tube device for the projection apparatus, the lens plate 130 is in the shape of a frame to which is attached an entrance lens 108 which is the last lens of the projection lens system. A lens barrel, not shown, supporting plural lenses of the projection lens system other than the entrance lens 108, is detachably attached to the lens plate 130.

Between the supporting frame 120 and the lens plate 130, a plurality of adjustment supporting members 110 are interposed for supporting the lens plate 130 in a manner of permitting position adjustment with respect to the supporting frame 120. The adjustment supporting members 110 are made up of a first bolt 113 provided upright on a rear surface of the lens plate 130, a second bolt 114 provided upright on the front surface of the supporting frame 120 for facing the first bolt 113 and a turnbuckle member 112 having first and second tapped holes 115, 116 for interconnecting these bolts 113, 114, as shown for example in FIG. 3. With the adjustment supporting member 110, the amounts of threaded engagement between the bolts 113, 114 with the tapped holes 115, 116 are changed on rotation of the turnbuckle member 112 for changing the distance between the supporting frame 120 and the lens plate 130.

With the present cathode ray tube device for the projection apparatus, by adjusting the adjustment supporting members 110 for changing the distance between the supporting frame 120 and the lens plate 130, the angle the supporting frame 120 makes with the lens plate 130 may be adjusted for adjusting the back focal length shown by arrow B in FIG. 2 and the elevation shown by arrow $\theta_H$ in FIG. 2.

Meanwhile, in the projection apparatus in which the cathode ray tubes 101B, 101G, 101R and the projection lenses 100, 100, 100 are positioned by the supporting members 105B, 105G, 105R, the distance between the projection apparatus and the screen 102, that is the distance of projection, is fixed and cannot be changed because it is necessary to change the convergence angle and the elevation in order to change the projection distance.

Meanwhile, for changing the projection distance without changing the convergence angle or the elevation, it may be contemplated to change the distance between the cathode ray tubes 101B, 101G, 101R shown by arrow P in FIG. 1. However, in order for the distance between the cathode ray tubes 101B, 101G, 101R to be changed, the projection apparatus must be complicated in construction, because the cathode ray tube needs to be mounted so that its attachment position with respect to the mounting base plate 103 may be changed.

On the other hand, with the projection apparatus employing the cathode ray tube device provided with the adjustment supporting members 110, it is difficult and complex to adjust the back focal length and the elevation correctly. With this conventional projection apparatus, the convergence angle can only be adjusted by tilting the cathode ray tube device for the projection apparatus in its entirety with respect to the mounting base plate of the projection apparatus, such that difficulties are presented if the adjustment is to be performed smoothly and accurately.

OBJECTS AND SUMMARY OF THE INVENTION

It is an object of the present invention to provide a cathode ray tube device wherein the problems inherent in the above-described conventional cathode ray tube device may be overcome.

It is another object of the present invention to provide a cathode ray tube device wherein the convergence angle, elevation and the back focal length can be adjusted easily and correctly.

According to the present invention, there is provided a cathode ray tube device for a projection apparatus for projecting an image on a screen, comprising a supporting frame mounted on a rim of a front panel section of said cathode ray tube, a lens plate in the form of a frame having a center aperture, said lens plate having a projection lens system attached thereto, and a positioning supporting member detachably mounted on a mounting base plate of said projection apparatus and adapted for positioning said supporting frame and said lens plate with respect to said mounting base plate for detachably supporting said supporting frame and said lens plate by said mounting base plate, said positioning supporting member having a lens plate supporting surface for supporting said lens plate at a tilt angle corresponding to a convergence angle with respect to said mounting base plate and a supporting frame supporting surface for positioning and supporting said supporting frame at a tilt angle corresponding to an elevation with respect to said lens plate and at a distance corresponding to a back focal length at back of said lens plate.

With the above-described cathode ray tube device for the projection apparatus, the convergence angle, elevation and back focal length conforming to various projection distances may be set easily and accurately by detaching and exchanging the positioning supporting member.

Other objects of the present invention will become more apparent from the following description of the preferred embodiments and the appended claims.

BRIEF DESCRIPTION OF THE DRAWINGS

FIG. 6 is a front view showing an arrangement of a positioning supporting frame of the cathode ray tube device for the projection apparatus shown in FIG. 5.

FIG. 7 is a schematic plan view showing an arrangement of a projection apparatus constructed using the cathode ray tube device shown in FIG. 5.

DETAILED DESCRIPTION OF THE PREFERRED EMBODIMENTS

Figure 1:
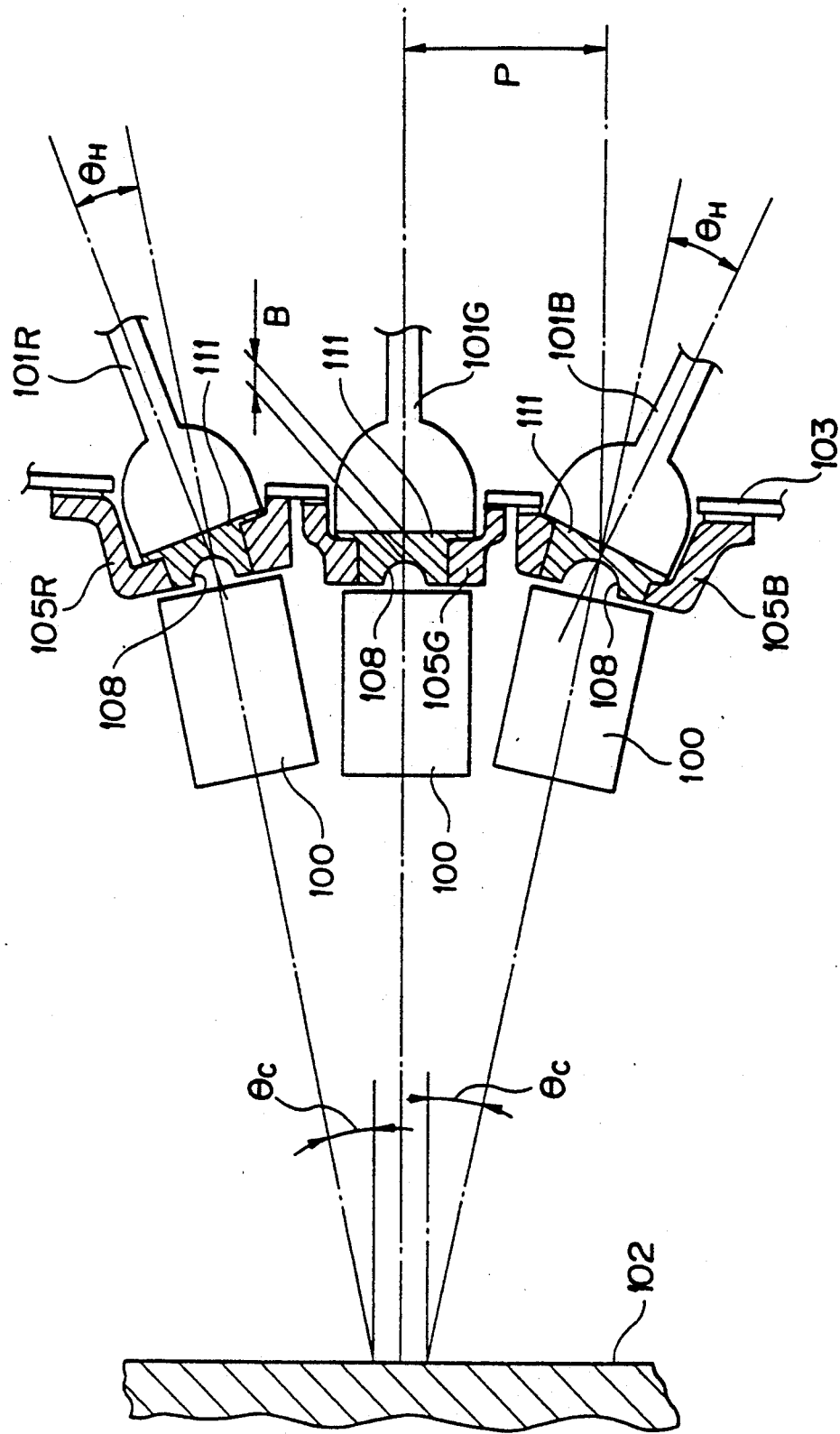
FIG. 1 is a plan view showing an arrangement of a conventional projection apparatus, with a portion thereof being broken away.
Figure 2:
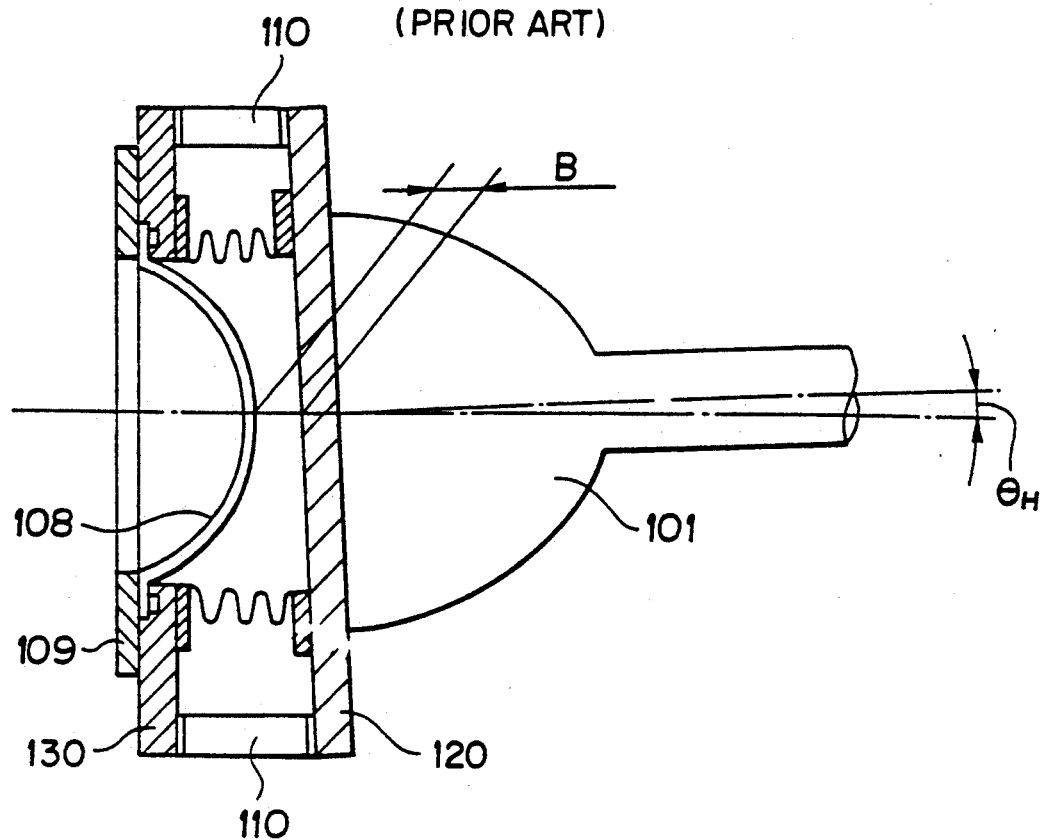
FIG. 2 is a longitudinal cross-sectional view showing the arrangement of the conventional cathode ray tube device for a projection apparatus shown in FIG. 1.
Figure 3:
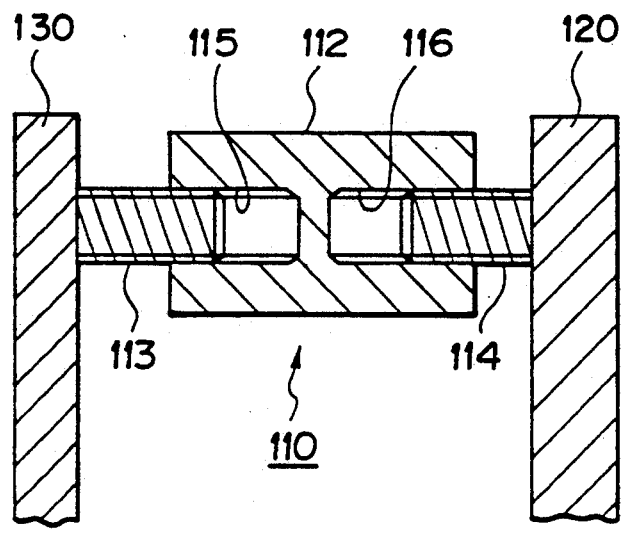
FIG. 3 is an enlarged longitudinal cross-sectional view showing an arrangement of adjustment supporting members of the conventional cathode ray tube device shown in FIG. 2.

Referring to the drawings, certain preferred embodiments of the present invention will be explained in detail.

Figure 4:
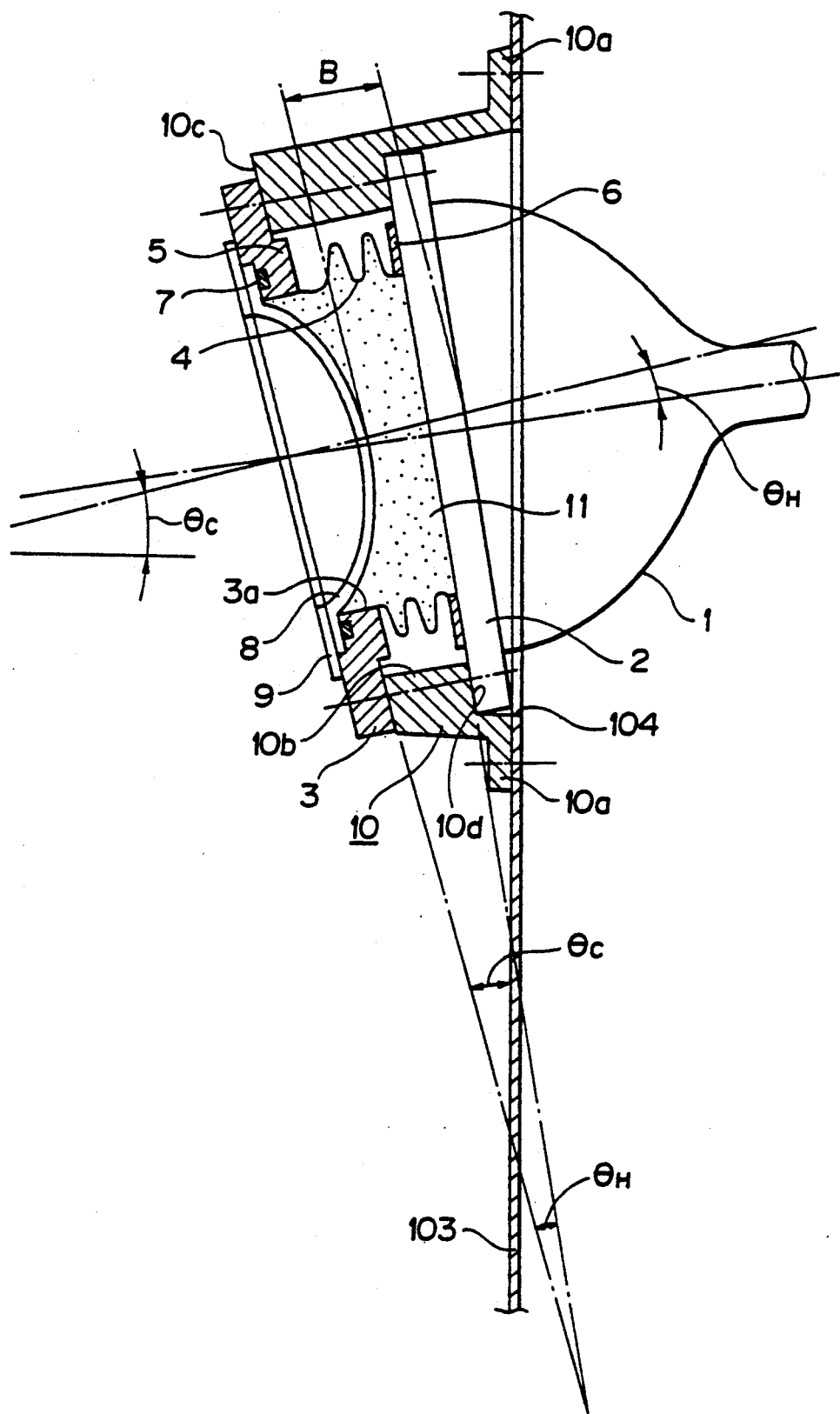
FIG. 4 is a longitudinal cross-sectional view showing an arrangement of a cathode ray tube device for a projection apparatus according to the present invention.

A cathode ray tube device for a projection apparatus according to the present invention includes a cathode ray tube 1, as shown in FIG. 4. The cathode ray tube 1 is arranged so that it is supplied with image signals and an image corresponding to the image signals are put on its substantially rectangular front panel section.

A supporting frame 2 is intimately connected to a rim of the front panel section. The supporting frame 2 is formed of metal or the like material in the form of a frame corresponding in shape to the front panel section.

A bellows member 4 has its end section attached to the front surface of the supporting frame 2 for surrounding the outer rim of the front panel section. The bellows member 4 is formed of a flexible elastic material, such as rubber, substantially in the form of a cylinder. That is, the bellows member 4 has plural bends along its entire length to facilitate its flexure and elastic displacement.

A lens plate 3 is attached to the front side of the bellows member 4 by means of a supporting ring 5. The lens plate 3 is formed as a frame having a center aperture 3a and has attached thereto an entrance lens 8 for closing the center aperture 3a. That is, the entrance lens 8 is supported forwardly of the front panel section for facing the front panel section.

Meanwhile, the entrance lens 8 has an O-ring 7 interposed between it and the lens plate 3 and is thrust by a thrusting ring 9 into tight intimate contact with the lens plate 3.

A confined void space is delimited by the front panel section, supporting frame 2, bellows member 4, lens plate 3 and the entrance lens 8 forwardly of the cathode ray tube 1. A cooling liquid 11 is filled in the void space. The cooling liquid 11 is held in a confined manner by the front panel section, supporting frame section, supporting frame 2, bellows member 4. lens plate 3 and the entrance lens 8. The cooling liquid 11 is a transparent liquid having a refractive index substantially equal to that of the vitreous material making up the front panel section and the entrance lens 8. The cooling liquid 11 prevents reflection at an interface of the front panel section and the entrance lens 8, while cooling the front panel section heated by the image put thereon. That is, the cathode ray tube device for the projection apparatus is arranged in accordance with a so-called liquid-cooled type optical coupling system (liquid optical coupling system).

The lens plate 3 and the supporting frame 2 are mounted on a mounting base plate 103 by means of a positioning supporting member 10. The positioning supporting member 10 is formed of metal or the like material substantially as a cylinder and is detachably mounted at a prescribed position of the mounting base plate 103 by means of a rear mounting piece 10a. The positioning supporting member 10 has an inwardly projecting rib 10b inwardly of its front end. The rear surface of the lens plate 3 is detachably attached to the front end face of the rib 10b, that is to the front end face of the positioning supporting member 10. On the other hand, the front end face of the supporting frame 2 is detachably attached to the rear end face of the rib 10b, that is at an inner portion of the positioning supporting member 10. A through-hole 104 passed through by the cathode ray tube 1 is formed at a position of the mounting base pate 103 mounting the positioning supporting member 10.

The front surface of the positioning supporting member 10, that is its lens plate mounting surface 10c, includes a predetermined convergence angle, as later described, with respect to the front surface of the mounting base plate 103, as shown by arrow $\theta_C$ in FIG. 4. The rear surface of the rib 10b of the positioning supporting member 10, that is its surface 10d mounting the supporting frame 2, includes a predetermined elevation, as later described, with respect to the lens plate mounting surface 10c on the front surface of the positioning supporting member 10, as shown by arrow $\theta_H$ in FIG. 4. With the lens plate 3 and the supporting frame 2 being supported by the positioning supporting member 10, the distance from the rear surface of the entrance lens 8 to the front panel section becomes the predetermined back focal, length to be later explained, as shown by arrow B in FIG. 4.

On the side front surface of the lens plate 3, a lens barrel, holding a group of lenses making up the projection lens 100 along with the entrance lens 8, is detachably mounted so that the projection lens system is located forwardly of each cathode ray tube 1R, 1G, 1B as shown in FIG. 7. With the above-described cathode ray tube device for the projection apparatus, when the tube barrel of the lens 100 is fitted to the lens plate 3, and the image is put on the front panel section, the image is displayed on a screen 102.

With the cathode ray tube device for the projector apparatus, three cathode ray tubes for a blue-colored component image, green-colored component image and a red-colored component image make up the projection apparatus, as shown in FIG. 7. That is, the cathode ray tube 1B of the cathode ray tube device for the projection apparatus for the blue-colored image puts a blue-color component image of the projected color image on the front panel section. The cathode ray tube 1G of the cathode ray tube device for the projection apparatus for a green-colored image puts a green-color component image of the projected color image on the front panel section. On the other hand, the cathode ray tube 1R of the cathode ray tube device for the projection apparatus for a red-colored image puts a red-color component image of the projected color image on the front panel section.

With the projection apparatus, the cathode ray device for green-colored image is placed at a front side of the screen 102. That is, with the present cathode ray tube device for the green-colored image, the lens plate 3 and the supporting frame 2 are supported by the positioning supporting member 10, whereby the optical axis of the projection lens and a normal to the front panel section of the cathode ray tube 1G are perpendicular to the screen 102.

Also, with the projection apparatus, the cathode ray tube device for blue-colored image and the cathode ray tube device for red-colored image are arranged on both sides of the cathode ray tube device for the green-colored image. With each of the cathode ray tube device for the blue-colored image and the cathode ray tube device for the red-colored image, a normal to the lens plate 3 supported by the positioning supporting member 10, that is the optical axis of the projection lens system attached to the lens plate 3, includes a convergence angle with the normal to the mounting base plate 103, as shown by arrow $\theta_C$ in FIGS. 4 and 7. On the other hand, the normal to the supporting frame 2 supported by the positioning supporting member 10, that is the axis of each of the cathode ray tubes 1B, 1R for blue-colored image and green-colored image, supported by the supporting frame 2, includes the elevation with the optical axis of the projection lens system, as shown by arrow $\theta_H$ in FIGS. 4 and 7. That is, with the present projection apparatus, the convergence angle and the elevation are set by the positioning supporting member 10.

Besides, with the present projection apparatus, the distance between the rear end face of the projection lens system and the front panel section, that is the back focal length, is set by the positioning supporting member 10 as a distance conforming to the distance between each of the cathode ray tube devices and the screen 102, that is the projection distance.

When a color image is displayed on the screen 102 by the above-described projection apparatus, the color images projected by the three cathode ray tube devices are superimposed one on others to form the color image.

If, with the above-described projection apparatus, the projection distance or the focal length of the projection lens system is changed for changing the magnification of projection, the positioning supporting members 10, 10, 10 of the cathode ray tube devices are exchanged with those conforming to the thus changed magnification of projection.

On the other hand, the convergence angle or the elevation may be suitably changed by suitably selecting positioning members 10 having different tilt angles of the lens plate mounting surface 10b and the supporting plate mounting surface 10d. Besides, the back focal length may be changed to a desired value by suitably selecting a positioning member 10 having a suitable preset height.

Figure 5:
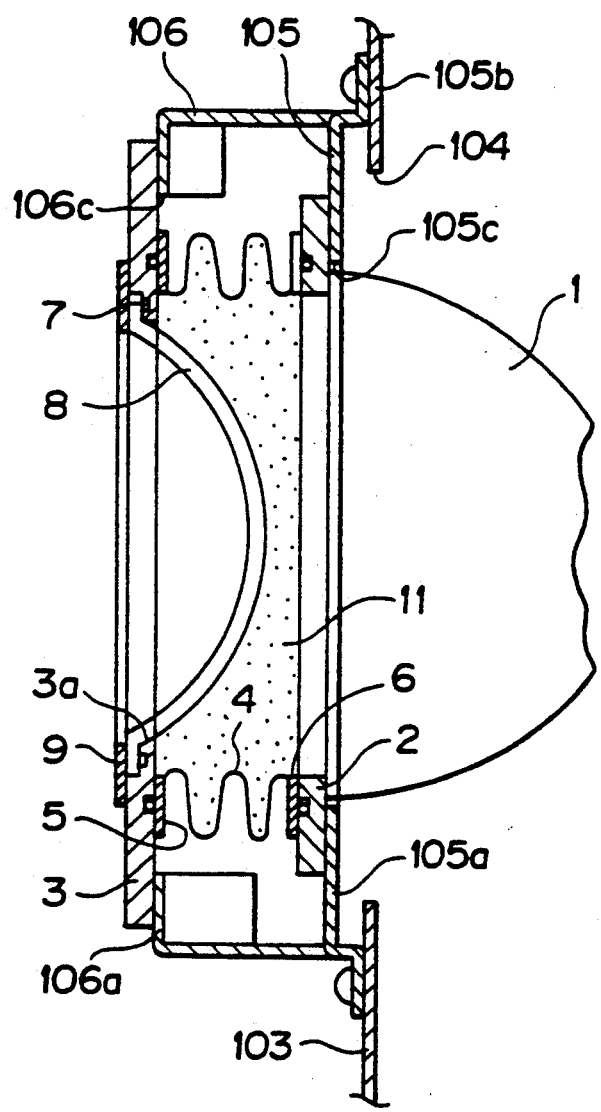
FIG. 5 is a longitudinal cross-sectional view showing another arrangement of a cathode ray tube device for a projection apparatus according to the present invention.

With the cathode ray tube device for the projection apparatus according to the present invention, first and second positioning supporting frames 106, 105 may also be used as positioning supporting members, as shown in FIGS. 5 and 6. The first positioning supporting frame 106 is formed by bending a plate member formed of metal or the like material. The first positioning supporting frame 106 has a front plate section 106a mounting the lens plate 3 and a supporting section 106b bent as one with and rearwards from the front plate section 106a for supporting the front plate section 106a with respect to the mounting base plate 103. Plural tapped holes 108 for detachably mounting the supporting plate section 106b of the first positioning frame 106 on the mounting base plate 103 are formed in the supporting section 106b. The front plate section 106a of the first positioning supporting frame 106 has a center aperture 106c passed through by the bellows member 4. The first positioning supporting frame 106 has the supporting section 106b supported by the mounting base plate 103 for supporting the lens plate 3 mounted on the front surface plate section 106a with a tilt corresponding to the convergence angle with respect to the front surface section of the mounting base plate 103.

The second positioning supporting frame 105 has a major surface plate section 105a mounting the supporting frame 2 and a supporting section 105b formed as one with and extended from the major surface plate section 105a for mounting the major surface section 105a on the mounting base plate 103. Plural tapped holes 107 for detachably mounting the supporting section 105b of the second positioning supporting frame 105 on the mounting base plate 103. The major surface plate section 105a has a center aperture 105c passed through by the cathode ray tube 1. The second positioning supporting frame 105 has its supporting section 105b attached to the mounting base plate 103 for supporting the supporting frame 2 mounted on the major surface plate section 105b with a tilt corresponding to the elevation with respect to the lens frame 3 supported by the first positioning supporting frame 3.

With the lens plate 3 being supported by the first positioning supporting frame 106 and with the supporting frame 2 being supported by the second positioning supporting frame 105, the distance from the rear surface of the entrance lens 8 to the front panel section becomes equal to the back focal length.

With the projection apparatus constructed using the above-described cathode ray tube device having these first and second positioning supporting frames 106, 105, the magnification of projection may be changed by exchanging the positioning supporting frames 106, 105 of the cathode ray tubes for those suited to the magnification of projection.

Besides, by suitably selecting the first positioning supporting frame 106 having a different tilt angle of the front plate section 106a mounting the lens plate 3 and the second positioning supporting frame 105 having a different tilt angle of the major surface plate section 105a mounting the supporting frame 2, the convergence angle and the elevation can be adjusted to suitable values. In addition, by suitably selecting a set of the first and second positioning frames 106, 105, having suitably different distances between the front plate section 106a of the first positioning frame 106 and the major surface plate section 105a of the second positioning frame 105, the back focal length can be set to a desired preset value.

If, with the above-described cathode ray tube device for the projection apparatus, the distance between the lens plate 3 and the supporting frame 2 is changed to change the inner capacity of the void space, or the volume of the cooling liquid 11 charged in the void space is changed with changes in temperature, the bellows member 4 is flexed and displaced with changes in the inner pressure in the cooling liquid 11, so that the inner pressure in the cooling liquid 11 is maintained in equilibrium with atmospheric without undergoing pressure fluctuations.

The cathode ray tube device for the projection apparatus according to the present invention is not limited to the above-described arrangements employing the liquid optical coupling system, but may comprise an arrangement employing a so-called pneumatic optical coupling system, in which case the cathode ray tube device may be constructed without use of the bellows member 4 or the cooling liquid 11.

What is claimed is:

1. A cathode ray tube device for a projection apparatus for projecting an image on a screen, comprising
   a cathode ray tube, a supporting frame mounted on a rim of a front panel section of said cathode ray tube,
   a lens plate in the form of a frame having a center aperture, said lens plate having a projection lens system attached thereto, and
   a positioning supporting member detachably mounted on a mounting base plate of said projection apparatus and adapted for positioning said supporting frame and said lens plate with respect to said mounting base plate for detachably supporting said supporting frame and said lens plate by said mounting base plate, said positioning supporting member having a lens plate supporting surface for supporting said lens plate at a tilt angle corresponding to a convergence angle with respect to said mounting base plate and a supporting frame supporting surface for positioning and supporting said supporting frame at a tilt angle corresponding to a elevation with respect to said lens plate and at a distance corresponding to a back focal length at back of said lens plate.

2. The cathode ray tube device for a projection apparatus as defined in claim 1 wherein a void space confined by said front panel section of said cathode ray tube, said supporting frame, a bellows member, said lens plate and said projection lens system is provided towards a front surface of said cathode ray tube and wherein a cooling liquid is charged into said void space.

3. The cathode ray tube device for a projection apparatus as defined in claim 1 wherein said cooling liquid is a transparent liquid having a refractive index substantially equal to that of a material of said projection lens system.

4. The cathode ray tube device for a projection apparatus as defined in claim 1 wherein said positioning supporting member has said lens plate mounting surface tilted at a tilt angle equal to the convergence angle with respect to a surface of said mounting base plate, said positioning supporting member also having said supporting frame mounting surface tilted at a tilt angle equal to the elevation with respect to a surface of said mounting base plate.

5. The cathode ray tube device for a projection apparatus as defined in claim 1 wherein said positioning supporting member comprises a first positioning supporting frame having a front surface plate section mounting said lens plate and a supporting section integrally bent rearwards from said front surface section for supporting said front surface section by said mounting base plate, and a second positioning supporting frame having a major surface plate section mounting said supporting frame and a supporting section integrally formed with said major surface plate section for supporting said major surface plate section by said mounting base plate.

6. A projection apparatus having three cathode ray tube devices arranged side by side on a mounting base plate of the projection apparatus, each of said cathode ray tube devices comprising a cathode ray tube, a supporting frame mounted on a rim of a front panel section of said cathode ray tube, a lens plate in the form of a frame having a center aperture, said lens plate having a projection lens system, and a positioning supporting member having a lens plate supporting surface for supporting said lens plate at a tilt angle corresponding to a convergence angle with respect to said mounting base plate and a supporting frame supporting surface for positioning and supporting said supporting frame at a tilt angle corresponding to an elevation with respect to said lens plate and at a distance corresponding to a back focal length at back of said lens plate, said positioning supporting member being detachably mounted on said mounting base plate of said projection apparatus and adapted for positioning said supporting frame and said lens plate with respect to said mounting base plate for detachably supporting said supporting frame and said lens plate by said mounting base plate.

7. The projection apparatus as defined in claim 6 wherein said three cathode ray tubes are used for forming blue-colored component images, green-colored component images and red-colored component images.

* * * * *